Figure 1:
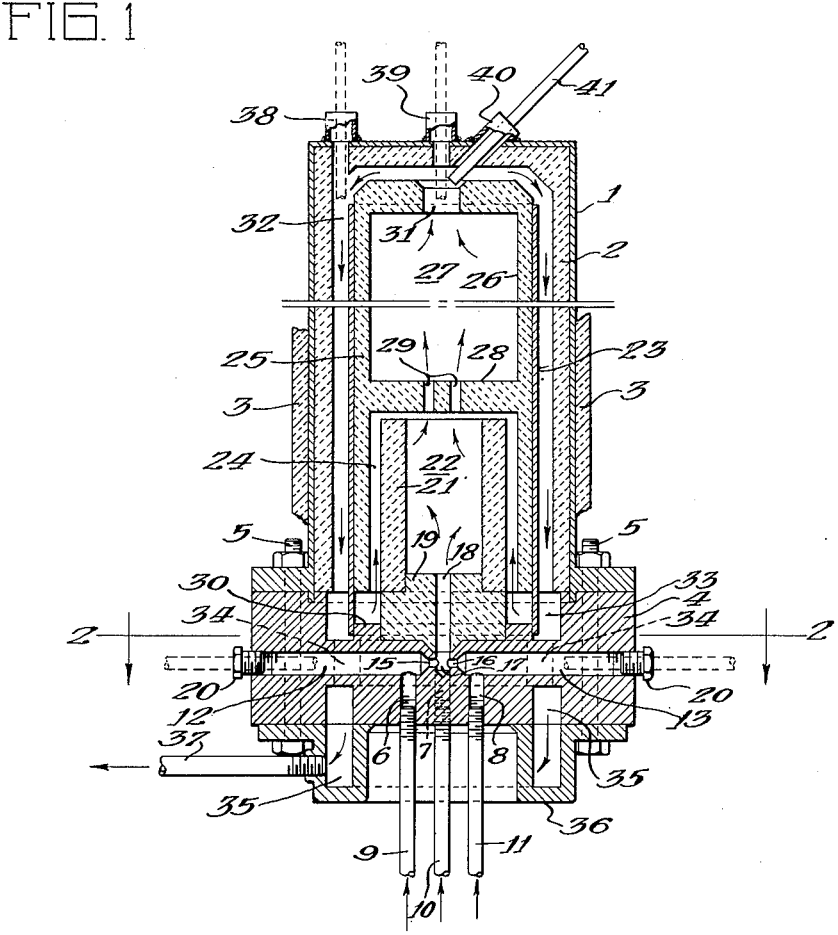

Nov. 14, 1950

R. M. DEANESLY 2,529,598

REACTOR FOR HIGH-TEMPERATURE CRACKING

Filed Aug. 30, 1949

INVENTOR.
Richard M. Deanesly
BY M. P. Venema
    Attorney
Philip T. Liggett
    Agent Patented Nov. 14, 1950

2,529,598

UNITED STATES PATENT OFFICE 2,529,598

REACTOR FOR HIGH-TEMPERATURE CRACKING

Richard M. Deanesly, Hinsdale, Ill., assignor to Universal Oil Products Company, Chicago, Ill., a corporation of Delaware Application August 30, 1949, Serial No. 113,229

6 Claims. (Cl. 23—284)

This invention relates to an improved type of reactor suitable for effecting high temperature cracking reactions, particularly for operations where it is desirable to have rapid mixing and heating, controlled time and temperature for conversion, as well as rapid quenching of the resulting product stream.

A mixing and contacting apparatus, or reactor, of the present type may for example be used in the high temperature cracking of hydrocarbons to produce acetylene from methane, ethane, propane, etc., where efficient mixing and controlled conditions of time and temperature are necessary. Alternately, the improved apparatus may be utilized for hydrocracking, where low molecular weight hydrocarbons are cracked in the presence of hydrogen, or for producing a product stream rich in hydrogen. In still other instances, the reactor may be used to advantage to effect the autothermic or oxidative cracking of volatile hydrocarbons to produce desirable olefins, dienes, or a fuel gas. The efficiency of a desired process with a resulting high product yield is dependent upon a desirable form of apparatus which effects a rapid mixing and contacting of reactant streams, as well as means for controlling reaction conditions of time and temperature, and in some cases providing for a quenching of the product stream. It is also a desirable feature to provide an apparatus that utilizes heat exchange flows which effect the cooling and preheating of the various stream and portions of the unit to the best advantage.

It is, therefore, a principal object of the present invention to provide a reactor which will effect the efficient mixing and contacting of reactant streams for high temperature conversion and cracking reactions.

It is also an object of the present invention to provide a reactor which has contiguous reaction sections with means for introducing reactant streams thereto in a uniform manner.

It is still another object of the present invention to provide a reactor design and arrangement that has all of its component parts readily demountable and accessible, and in particular, maintains an inlet section for reactant streams that is not positioned within an enclosed housing or the like.

Briefly, a simplied embodiment of the improved reactor comprises in combination, an inlet section having fluid or gas inlet ports thereto, with two of said ports having orifices or passageways therefrom converging and opposing one another at a mixing throat, the mixing throat in turn connecting with and discharging axially into an inner tubular member forming a first contacting and reaction section, an intermediate tubular member circumscribing and spaced from the inner tubular member providing an inner annular fluid or gas passageway and orifice communicating with the outlet end of the first reaction section, a portion of the intermediate member extending beyond the first reaction section and forming a second open-ended reaction section contiguous with and in alignment with the former, an outer tubular member circumscribing and spaced from the intermediate member providing a second annular fluid and gas passageway communicating with the outlet end of the second reaction section, at least one of the aforesaid fluid or gas inlet ports connecting to the inlet section communicating with the inner annular fluid passageways, and outlet means connecting with the outer annular passageway for withdrawing resulting reaction product from the second reaction section.

As hereinbefore mentioned, the elongated tubular type of reactor comprising this invention is particularly adapted to effect high temperature conversion and cracking operations, with means being provided for effecting rapid and efficient mixing of reactant streams. The inner annular passageway and orifice provided by the tubular members of the present apparatus is particularly effective to introduce a subsequent reactant stream uniformly and evenly into the centrally and axially located reaction sections. The annular passageways further provide for indirect heat exchange flows, for example the inner annular passageway is effective for the heating of the charge stream introduced therethrough, or alternately, the cooling of the hot inner tubular member having a high temperature processing operation therein. Each of the members, including the inlet section and the tubular or cylindrical members forming the contiguous reaction sections are provided of a high temperature resisting material, such as carborundum, alumina, porcelain, alloy steel, or other suitable refractory materials. The type of material selected of course depends upon the type of processing operation to be carried out in the reactor as well as the temperature encountered in a particular portion of the reactor.

In a desirable embodiment of the improved apparatus, the reactor comprises four principal parts, namely an inlet section, an inner tubular member, an intermediate tubular member, and an outer tubular member, with an inner annular passageway being formed between the inner and intermediate members and an outer annular passageway being formed between the intermediate and outer tubular members. Further, the members are preferably cylindrical and each removably maintained in position by suitable spacing means on the inlet section, while the outer tubular member is removably attached to or clamped to the inlet section, which forms a base member, thus, the reactor may be easily assembled, or disassembled for inspection or cleaning purposes as well as for replacement of members.

In order to obtain high conversion efficiency in most of the high temperature cracking or conversion operations, it is desirable to preheat the reactant streams to a high preheat temperature, and to conserve heat within the processing unit. Therefore, in a desirable and preferred embodiment of the reactor, insulation is provided around the aforementioned outer tubular member of the reactor and the outer annular outlet passageway which is provided for the resulting product stream discharged from the second reaction section, passes in a heat exchange relationship with the intermediate tubular member. This arrangement provides for heat exchange between the resulting product stream and at least one of the inlet reactant streams and in addition passes the product stream to the inlet section of the reactor which has means for passing the stream therethrough to a suitable outlet header, or alternately, to a heat recuperating section that, if desired, may be attached to the inlet section and provide for the preheating of all of the reactant streams adjacent thereto.

The construction and arrangement of the improved apparatus of this invention, as well as the operation thereof for efficiently carrying out high temperature conversion operations, will be more clearly understood upon reference to the accompanying drawing and the following description thereof.

Figure 1 of the drawing is a sectional elevation view through one embodiment of the improved reactor apparatus of this invention.

Figure 2:
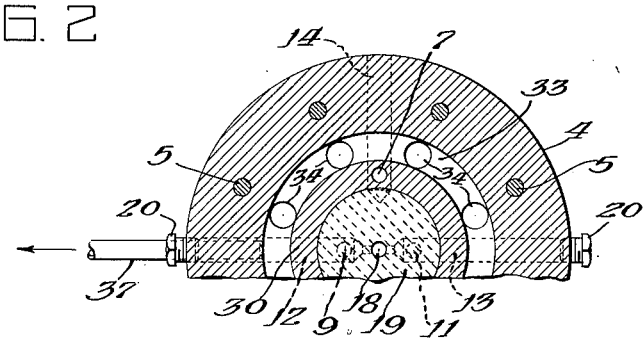

Figure 2 of the drawing is a partial sectional plan view through the inlet section of the unit, as indicated by the line 2—2 shown in Figure 1 of the drawing.

Referring now to the drawing, there is shown an elongated outer tubular member 1, which is indicated as having an outer shell of metal, or the like, and an inner refractory lining 2 of insulating material suitable to withstand high temperatures. The outer member 1 may also, if desired, be provided with a suitable outside insulating material 3 suitable to insulate and retain heat within the reactor unit. The lower portion of the member 1 is flanged and is adapted to seat on and connect with a base inlet member 4, the members in this embodiment being removably connected by suitable studs or bolts 5.

The inlet or base section 4 is particularly designed and constructed to accommodate and support the various tubular sections forming the reactor as will hereinafter be described, as well as accommodate the various inlet lines and ports for the reactant streams, and an outlet means for the resulting product stream formed within the reactor. The present embodiment provides three inlet ports 6, 7 and 8, having connecting thereto conduits 9, 10 and 11, respectively. Each of the inlet ports enter the lower portion of the inlet base member 4 and extend upwardly to connect with the lateral passageways 12 and 13 that extend substantially at right angles to the inlet ports themselves. The lateral passageway 12 communicates with the inlet port 6, while the lateral passageway 13 communicates with the inlet port 8, and a third lateral passageway 14, indicated in plan view in Figure 2 of the drawing, connects with the inlet port 10. The inner ends of each of the lateral passageways 12 and 13 are restricted and form orifices 15 and 16 respectively, which in turn discharge into a vertical mixing throat 17. The mixing throat in turn discharges into an extended restricted passageway 18 within a mixing block 19 which extends upwardly from the upper face of the base or inlet member 4.

It is a particular feature of the present reactor unit to have a mixing section which rapidly and intimately mixes the reactant streams prior to their introduction into the reaction zone, and as may be noted from the drawing, rapid mixing is obtained from the opposing orifices 15 and 16 which introduce the reactant streams into the mixing throat of the unit. It may also be pointed out, that in a desired embodiment of the apparatus, that the opposing inlet orifices or jets 15 and 16 may be placed in a slightly offset relationship, whereby the reactant streams are introduced into the mixing throat 17 in an off-center manner, causing a swirling or centrifugal type of flow within the vertical throat 17 and passageway 18, with a resulting rotary swirl of the gaseous mixture being maintained within at least a portion of the elongated reaction zone 22 extending above the member 19.

Each of the lateral passageways 12, 13 and 14 may be used to advantage for the introduction of and mounting of thermocouples, or other temperature indicating means, which in turn are of advantage for carrying out an efficient conversion operation. Thermocouples may be positioned and held in place by suitable bushing members, such as 20 indicated at the outer ends of the passageways 12 and 13. One of the passageways may also be used to advantage in starting up the unit by providing a lighting port for igniting the reactant streams.

Extending beyond the member 19, having the elongated mixing throat and pasageway 18 and co-axially with the latter, is an inner tubular member 21 providing an elongated and enlarged reaction section 22. For high temperature operations, such as the production of acetylene or the autothermic cracking of volatile hydrocarbons, the block 19 and the inner tubular member 21 are necessarily of a refractory nature suitable to withstand high temperature conditions, with such materials as alumina, carborundum, refractory, fire brick and the like, being utilized for this portion of the apparatus. While the present embodiment indicates the members 19 and 21 as being of two separate pieces, it is also within the scope of the present invention to utilize a single refractory member to form the base member having the mixing throat passageway and the elongated enlarged reaction zone.

An intermediate tubular member 23 extends co-axially with and concentrically around the inner tubular member 21 in a manner to form annular passageway 24 and a further extended reaction zone 27. The present embodiment, indicates the intermediate tubular member 23 as having an inner refractory portion 25 which has its inner face spaced from the outer wall of the tubular member 21 to form the aforesaid annular passageway 24, while the upper refractory lined portion 26 forms a second reaction zone 27. The latter is separated from the inner reaction zone 22 by a suitable partitioning member 28 having a plurality of openings or passageways 29, which in turn are suitable to transmit the product stream from zone 22 into the elongated zone 27. In the construction of the particular reactor illustrated, at the point where the intermediate member 23 connects with the inlet base member 4, a raised boss or shoulder 30 is provided which is suitable to maintain the inner mixing throat and passageway member 19 in a central position as well as support the intermediate member 23. Also, reference to Figure 2 of the drawing, illustrates the inlet port 7 extending upwardly through the base member 4 and the raised shoulder 30, whereby a reactant stream may be introduced through the conduit 10, the inlet port 7, and the annular passageway 24, upwardly to the outlet end of the first reaction zone 22. Thus, a third reactant stream, or diluent or the like, may be introduced into the reactor at an intermediate point and passed with the product stream through the passageways 29 into the upper reaction section 27.

It is a particular feature of the present embodiment of this reactor, to provide the foregoing means for introducing a reactant stream, or other gaseous stream, upwardly around the inner tubular member 21, which maintains or houses the high temperature reaction zone of the unit, such that the stream effects a cooling action on the exterior wall of the tubular member, thus permitting the use of a material which might not otherwise withstand the high temperature conditions. The stream passing upwardly through the annular passageway 24 is also of course subjected to a preheating by the heat exchange relationship with the tubular member 21.

At the upper end of the intermediate tubular member 23, a cover portion, or as indicated an extension of the refractory liner 26 provides a restricted outlet 31 for the resulting product stream from the upper reaction section 27. The upper portion to the intermediate member is, like the elongated wall portion, spaced from the inner face of the refractory liner 2 of the outer housing member 1. There is thus formed an annular product passageway 32 which extends from the outlet 31 across the top of the reactor and the full length of both the intermediate and the outer tubular members. The lower end of the annular passageway 32 discharges into a recessed portion 33 being formed in the upper portion of the inlet base section 4. The collecting section 33 in turn discharges through a plurality of openings or passageways 34 downwardly into a lower recessed portion 35, which is in turn suitable to pass the product stream outwardly to a conduit or header connecting with the lower end of the base member 4. In the drawing, a collecting ring or header member 36 is provided at the lower end of the inlet base member 4 to collect and discharge the resulting product stream by way of conduit 37. The header 36 is of a continuous ring type of construction suitable to permit connecting the inlet conduits 9, 10 and 11 to the respective inlet ports within the base member 4. However, it is not intended to limit the improved reactor of this invention to any particular type of header or collecting means, and as mentioned hereinbefore, if desired a recuperative heat exchange section may be connected directly to the base member 4 whereby to pass the product stream in heat exchange relationship with the inlet conduits.

At the upper end of the outer tubular member 1 there are shown couplings or connecting members 38 and 39, which are suitable to permit the insertion and positioning of thermowells or other instruments that aid in carrying out a uniform conversion operation. The inlet 38 is positioned such that a thermowell may be extended longitudinally down into the annular passageway 32, while the inlet 39 is positioned in a manner to permit a thermowell being inserted axially down through the outlet opening 31 and into the reaction section 27. It is also a feature of the present embodiment to have a nozzle or coupling suitable to permit the insertion of a quench conduit 41. The present construction is such that the coupling 40 connects with the outer tubular member 1 in an angular manner such that the quench line 41 will extend angular downwardly into the passageway 32 at the outlet passageway 31. Thus, a suitable quenching medium may be introduced into the reactor at a point where the product stream is being withdrawn, permitting the immediate and rapid quenching of the product stream as it leaves the reaction zone itself.

In order to further illustrate the utility of the present reactor as well as its operation, let it be assumed that the reactor is to be used for the production of acetylene from methane, ethane, or other low molecular weight hydrocarbon gas or a mixture thereof, in a high temperature cracking operation, with heat being supplied by the combustion of natural gas or a hydrocarbon gaseous mixture in the presence of oxygen or an air stream. Thus, air or oxygen may be introduced through the conduit 9 and the inlet port 6 and orifice 15 to the mixing throat 17 and passageway 18, where it combines with a suitable fuel gas which is in turn introduced through the conduit 11, the inlet port 8 and the orifice 16. Thus, a high temperature combustion of the fuel gas may be effected within the mixing passageway 18 and the enlarged combustion zone as provided by the inner section 22, whereby the resulting hot combustion gases, maintained above 1500° F., may be provided in the upper and outlet end of the inner section 22. As noted hereinabove, either of the lateral passageways 12 or 13, which are normally used for thermowell connections or the like, may be utilized as a lighting port to ignite the air and fuel mixture.

The hydrocarbon stream which is to be cracked, is passed by way of conduit 10 and the extended inlet port 7 upwardly to the inner annular passageway 24, the latter subsequently uniformly distributing the reactant stream through the space between the upper end of the inner member 21 and the lower base of the partitioning or restricting member 28, whereby a substantially uniform mixing between the hot combustion gas stream and the reactant stream takes place and the mixed stream passes upwardly through the port or ports 29 into the elongated reaction zone 27. Within the upper contacting section 27, the hydrocarbon gas stream is converted by the hot combustion gas stream into a high yield of acetylene, with the temperature, contact time, and stream velocity all being controlled to provide optimum conversion conditions. Although not indicated in the present embodiment, it is within the scope of the present invention to utilize packing of refractory balls, baffling members or the like within the interior of the section 27 in order to insure intimate and uniform mixing of the streams as they pass longitudinally upwardly thereto.

In order to maintain a high yield of acetylene, it is normally desirable to provide a quench stream, such as steam, hydrocarbon vapors, carbon dioxide, or the like, and in the present embodiment such a stream may be readily introduced by way of the quench conduit 41 which terminates at the outlet of the upper reaction zone, at the passageway 31. Thus, a quenched product stream may be passed through the annular passageway 32 and collecting zones and passageway provided within the lower inlet member 4, which in turn connect to an outlet header such as 36, or to other collecting and transmitting means.

It may again be pointed out that very advantageous heat exchange flows are obtained within the improved reactor of this invention, with the hydrocarbon stream to be cracked passing upwardly in heat exchange relationship with the hot combustion zone maintained within the inner tubular member 21, such that the latter member is cooled while the hydrocarbon stream is preheated to the desired high temperature. Also, the resulting hot product stream from the upper end of the reaction section 27 and passing through the annular passageway 32 is in heat exchange relationship with the intermediate tubular member 23 and the high temperature cracking zone 27 maintained therein which must be maintained at a high temperature to provide a high conversion efficiency.

It may be further noted, that the relatively large extended inlet and base portion 4 is constructed and arranged in a manner to keep to a minimum any heat transfer from the high temperature zone at the mixing throat 17 and passageway 18. The annular zone 24, carrying the reactant stream from inlet port 7 and extending upwardly from above the shoulder or boss member 30, is arranged so that heat is absorbed from the mixing block member 19, while the product outlet or recessed portion 33 and the passageways 34 carrying the resulting product stream also are effective to absorb heat from the inlet block, and as indicated in the drawing, normally an alloy metal rather than a ceramic refractory type of material may be used, even when the reactor is used for high temperature conversion operations such as in the production of acetylene.

While the foregoing arrangement and operation of the reactor in this invention has been described in connection with the production of acetylene from a hydrocarbon vapor or gaseous stream, it is not intended to limit the use of the apparatus to only this type of conversion operation, for it may well be used in connection with other high temperature processes, such as, for example, the production of aromatic hydrocarbons in the high temperature cracking of low molecular weight unsaturated hydrocarbons or from natural gas hydrocarbons with the fuel gas and air stream being regulated to produce a combustion gas which is rich in hydrogen so that a hydrocracking operation is effected. Further, high temperature autothermic cracking of ethane, propane or the like, in order to produce various desired olefinic products may be effected with the present improved reactor with a high degree of conversion efficiency. In autothermic operations, the inlet conduit 10 and the inner annular passageway 24 may be used to advantage to introduce a suitable diluent stream into the product stream passing from the upper end of the inner zone 22 and into the subsequent zone 27 within the upper end of the reactor.

One of the principal advantages of the construction and arrangement of the present improved reactor, is the easy assembly and removability of all of the principal members comprising the unit such that they may be readily assembled or disassembled for replacement, and inspection purposes. In addition, it is a principal feature to have the arrangement and construction such that all of the reactant stream inlet ports, as well as thermocouple wells and the like, are accessible from the exterior of the apparatus. In other words, the inlet section 4 provides a base for the entire reactor, whereby the inlet ports, the outlet port, and thermowells for checking the temperature of inlet streams are all readily and removably connected thereto from the exterior of the unit. Still further, the upper face or surface of the inlet member 4 is provided with suitable bosses and shoulders, such as the shoulder 30, and an outer exterior raised portion which accommodates the flange of the outer tubular member 1, providing thereby means for maintaining proper alignment of each of the tubular members extending thereabove. The continuous raised shoulder or boss 30 aligns both the inner members 19 and its extended section 21, while the intermediate tubular member 23 extends down and around the boss and is thus maintained in a proper position. Although not indicated in the drawing, additional spacer members or ribs may be positioned between each of the tubular members as may be necessary to aid in maintaining their proper positioning in alignment with one another, particularly at the upper extremites thereof.

It is also within the scope of the present invention to utilize a catalytic material within either or both of the contacting sections as provided by 22 and 27 whereby to aid in effecting a particular conversion operation.

By way of summary, it is to be particularly noted that the construction and arrangement of the reactor is such as to provide rapid and thorough mixing of all reactant streams, through opposing jet inlets and through the annular passageway 24 and its continuous annular type of orifice formed between the inner tubular member 21 and the baffle or partitioning member 28 extending thereacross at a spaced distance. The inlet annular passageway 24 and the exterior outer annular passageway 32 both provide desired heat exchange flows, permitting the operation of the unit at high temperatures and simultaneously effecting a preheating of reactant streams for resulting high conversion efficiencies.

I claim as my invention:

1. A reactor for effecting the mixing and contacting of fluid reactant streams which comprises in combination, an inlet section having a plurality of fluid inlet ports thereto with at least two of said ports converging and opposing one another at a mixing throat, said throat connecting with and discharging axially into an open-ended inner tubular member forming an inner reaction section, an intermediate tubular member circumscribing and spaced from said inner member providing an inner annular fluid passageway and an orifice communicating with the outlet end of said inner reaction section, an inlet port through said inlet section communicating with said inner annular passageway, a portion of said intermediate tubular member extending beyond the first said reaction section and forming a second open-ended reaction section contiguous with the first, a confined outer tubular member spaced from said intermediate member and providing an outer annular passageway communicative with the outlet end of said second reaction section, and fluid outlet means from said outer annular passageway at said inlet section, whereby a resulting product stream passes through last said passageway in heat exchange relationship with said intermediate tubular member.

2. The reactor of claim 1 further characterized in that each of the tubular members are spaced concentrically with respect to one another, and said inlet section has seating means accommodating projecting end portions of each of said tubular members and maintaining them in aforesaid concentric relationship, with each of said members being removably connected to said inlet section.

3. The reactor of claim 2 still further characterized in that said intermediate member has an inner perforate partitioning means extending across and spaced a short distance from the outlet end of said inner reaction section, and a second partitioning means extending across the outlet end of said second reaction section with each partitioning means providing a restricted fluid passageway therethrough.

4. A reactor for mixing and contacting gaseous reactant streams, which comprises in combination, an inlet section having a plurality of fluid inlet ports thereto, with at least two of said ports converging and opposing one another at a mixing throat, said throat extending perpendicularly to said inlet orifices and discharging axially into an open-ended cylindrically shaped inner tubular member forming an inner reaction section, an intermediate cylindrically shaped tubular member circumscribing and spaced from said inner tubular member forming an inner annular fluid passageway and orifice communicating with the outlet end of said inner reaction section, a portion of said intermediate tubular member extending beyond and in alignment with the first said reaction section and forming a second open-ended reaction section contiguous with the first, a confined outer tubular member spaced from said intermediate member and forming thereby an outer annular passageway communicative with the outlet end of said second reaction section, said intermediate cylindrical member having partitioning means extending thereacross at a short distance from the open outlet end of said inner tubular reaction section and at the end thereof and additional partitioning means across said second reaction section, with restricted area fluid passageways extending through each of said partitioning means, projecting and spacing means at one face of said inlet section adapted to removably hold each of said cylindrical tubular members to said inlet section and in proper concentric spacing relationship with one another, a fluid inlet port extending through said inlet section and into communication with said inner annular passageway, and a fluid outlet means extending through said inlet section communicative with said outer annular passageway, whereby a resulting product stream from said second reaction section passes in a reverse and heat exchange flow around said intermediate cylindrical member through said outer passageway to said fluid outlet means in said inlet section.

5. The reactor of claim 4 further characterized in that a quench stream conduit extends through said confined outer tubular member and terminates at the proximity of said restricted passageway from said second reaction section, whereby a fluid stream may be commingled with the product stream passing from the latter section, and prior to the passage of the combined stream through said outer annular passageway, and said inlet section has continuous recesses therein that are in communication with said inner and outer annular passageways in a manner substantially circumscribing said mixing throat and said inlet portion of said inner reaction section.

6. The reactor of claim 5 still further characterized in that said inlet section has access passageways extending laterally therethrough at substantially right angles to each of said inlet ports, with one lateral passageway for each of said inlet ports, and each passageway adapted to removably accommodate thermowells therein, and said outer confined tubular member has openings therein at the end opposite said inlet section whereby to removably accommodate thermowells adapted to be positioned longitudinally within said reactor.

RICHARD M. DEANESLY.

No references cited.